United States Patent
Lee et al.

(10) Patent No.: US 7,735,025 B2
(45) Date of Patent: Jun. 8, 2010

(54) PORTABLE TERMINAL HAVING MOTION-RECOGNITION CAPABILITY AND MOTION RECOGNITION METHOD THEREFOR

(75) Inventors: Ki-Tae Lee, Seoul (KR); Dong-Yoon Kim, Seoul (KR); Won-Chul Bang, Sungnam-si (KR); Eun-Seok Choi, Anyang-si (KR); Sung-Jung Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1188 days.

(21) Appl. No.: 11/326,015

(22) Filed: Jan. 5, 2006

(65) Prior Publication Data

US 2006/0255139 A1      Nov. 16, 2006

(30) Foreign Application Priority Data

May 12, 2005      (KR)      .................... 10-2005-0039913

(51) Int. Cl.
*G06F 3/033*      (2006.01)
(52) U.S. Cl. .................. 715/863; 345/156; 345/158
(58) Field of Classification Search ......... 345/156–184; 715/863
See application file for complete search history.

(56) References Cited

U.S. PATENT DOCUMENTS

| | | | | |
|---|---|---|---|---|
| 4,787,051 A * | 11/1988 | Olson | .......................... | 345/179 |
| 6,308,134 B1 * | 10/2001 | Croyle et al. | ................ | 701/220 |
| 6,369,794 B1 * | 4/2002 | Sakurai et al. | .............. | 345/156 |
| 6,529,144 B1 * | 3/2003 | Nilsen et al. | ................... | 341/20 |
| 7,184,020 B2 * | 2/2007 | Matsui | ........................ | 345/156 |
| 7,259,756 B2 * | 8/2007 | Park et al. | ..................... | 345/204 |
| 7,365,735 B2 * | 4/2008 | Reinhardt et al. | ............ | 345/156 |
| 7,535,456 B2 * | 5/2009 | Liberty et al. | ................ | 345/158 |
| 2002/0145596 A1 * | 10/2002 | Vardi | .......................... | 345/179 |
| 2003/0132909 A1 * | 7/2003 | Haynes | ........................ | 345/156 |
| 2004/0172167 A1 | 9/2004 | Pasolini et al. | | |
| 2004/0239626 A1 * | 12/2004 | Noguera | ...................... | 345/158 |
| 2005/0212756 A1 * | 9/2005 | Marvit et al. | ................ | 345/156 |
| 2005/0216867 A1 * | 9/2005 | Marvit et al. | ................ | 715/863 |
| 2005/0219213 A1 * | 10/2005 | Cho et al. | ..................... | 345/158 |
| 2005/0253806 A1 * | 11/2005 | Liberty et al. | ................ | 345/156 |
| 2006/0017692 A1 * | 1/2006 | Wehrenberg et al. | ......... | 345/156 |
| 2006/0028446 A1 * | 2/2006 | Liberty et al. | ................ | 345/158 |
| 2006/0125782 A1 * | 6/2006 | Orchard et al. | .............. | 345/156 |
| 2008/0174550 A1 * | 7/2008 | Laurila et al. | ................ | 345/158 |

FOREIGN PATENT DOCUMENTS

| | | |
|---|---|---|
| GB | 2 357 673 | 6/2001 |
| KR | 10-2002-0091002 | 12/2002 |
| WO | WO 01/86920 | 11/2001 |

\* cited by examiner

*Primary Examiner*—Richard Hjerpe
*Assistant Examiner*—Gregory J Tryder
(74) *Attorney, Agent, or Firm*—The Farrell Law Firm, LLP

(57) ABSTRACT

A motion-recognition portable terminal and a motion recognition method therefor are provided. In the portable terminal, a motion key starts to create a motion entry, upon activation. A motion detector measures an acceleration along each axis of the portable terminal, upon activation of the motion key. A controller determines whether the motion entry has been completed based on the variation of the each-axis acceleration.

12 Claims, 8 Drawing Sheets

PORTABLE TERMINAL HAVING MOTION-RECOGNITION CAPABILITY AND MOTION RECOGNITION METHOD THEREFOR

PRIORITY

This application claims priority under 35 U.S.C. §119 to an application entitled "Portable Terminal Having Motion-Recognition Capability And Motion Recognition Method Therefor" filed in the Korean Intellectual Property Office on May 12, 2005 and assigned Serial No. 2005-39913, the contents of which are incorporated herein by reference.

BACKGROUND OF THE INVENTION

1. Field of the Invention

The present invention relates generally to a portable terminal having motion-recognition capability and a motion recognition method therefor, and in particular, to a portable terminal having a motion key for creating a motion entry upon activation, a motion detector for, upon activation of the motion key, measuring three-axis (X-, Y- and Z-axis) accelerations of the portable terminal, and a controller for determining whether the motion entry is completed based on the change of the three-axis acceleration measurements.

2. Description of the Related Art

In recent years, the use of mobile phones or PDAs (Personal Digital Assistants) has increased dramatically. These portable terminals find wide use in increasing applications including image capturing with an equipped digital camera, satellite broadcasting reception, and games, beyond basic phone calls or scheduling.

In addition, a motion detector may be added to a portable terminal so that the motion or inclination of the handset itself can be used as a form of manipulation, instead of pressing a keypad with buttons or touching a touch screen.

For instance, shaking the portable terminal twice up and down can be used to conclude spam calls or delete spam messages. If a user air-draws a number with the portable terminal, the portable terminal will read this movement and dial the number by short dialing. The portable terminal can allow the user to play a percussion instrument like tambourine by shaking the portable terminal. The portable terminal also may have a motion beat box function that enables the user to shake the portable terminal to create a sound in rhythm with a motion. Drawing an "O" or "X" can cause the portable terminal to respond with a voice message "yes" or "no" in on-line games or in using emoticons. In addition, another song can be selected by means of a simple up and down motion of the portable terminal during MP3 playing.

Conventionally, the user first activates the motion key (On), makes an intended motion with the portable terminal, and then deactivates the motion key (Off).

A distinctive shortcoming with the conventional motion entry method is that severe shaking caused by an off motion of the motion key or a too slow or fast off motion of the motion key may decrease a motion detection rate. In addition, the user needs repeated learning to turn off the motion key in at a proper time.

SUMMARY OF THE INVENTION

An object of the present invention is to substantially solve at least the above problems and/or disadvantages and to provide at least the advantages below. Accordingly, an object of the present invention is to provide a motion-recognition portable terminal for extracting a motion period by monitoring the completion of the motion in real time irrespective of the turn-off of a motion key.

Another object of the present invention is to provide a motion-recognition portable terminal for detecting the completion of a motion based on a three-axis signal variation derived from X-, Y- and Z-axis accelerations of the portable terminal measured at the completion time of the motion.

A further object of the present invention is to provide a motion completion detecting method for extracting a motion period by monitoring the completion of the motion in real time irrespective of the turn-off of a motion key.

Another object of the present invention is to provide a motion completion detecting method for detecting the completion of a motion based on a three-axis signal variation derived from X-, Y- and Z-axis accelerations of a portable terminal measured at the completion time of the motion.

According to one aspect of the present invention, in a portable terminal, a motion key starts to create a motion entry, upon activation. A motion detector measures an acceleration along each axis of the portable terminal, upon activation of the motion key. A controller determines whether the motion entry has been completed based on the variation of the acceleration along each axis.

According to another aspect of the present invention, in a method of detecting motion entry completion in a portable terminal, a motion key is activated, and a motion entry is created. An acceleration is measured along each axis of the portable terminal and it is determined whether the motion entry has been completed based on the variation of the acceleration along each axis.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a portable terminal having improved motion entry capability and a motion entry method for the portable terminal. The following description is made with the reference to the X, Y and Z axes, and three-axis accelerations described below are accelerations along the three axes.

Figure 1:
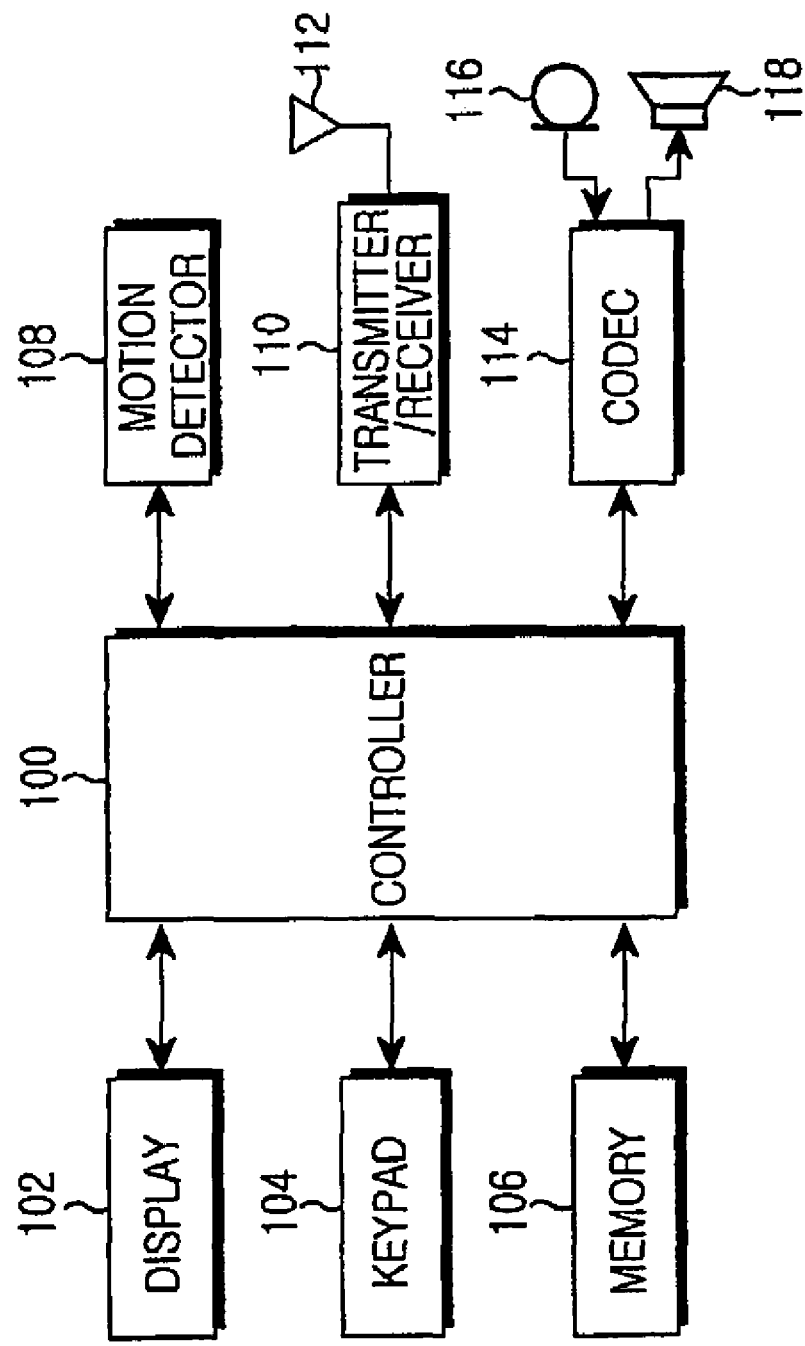
FIG. 1 is a block diagram of a portable terminal having improved motion entry capability according to an embodiment of the present invention.

FIG. 1 is a block diagram of a portable terminal with improved motion entry capability according to an embodiment of the present invention.

Referring to FIG. 1, the portable terminal includes a controller 100, a display 102, a keypad 104, a memory 106, a motion detector 108, a transmitter/receiver 110, an antenna 112, a CODEC (Coder-Decoder) 114, a microphone 116, and a speaker 118.

The controller 100 provides overall control to the operations of the portable terminal. For example, the controller 100 processes and controls voice call and data communication. In addition to its typical functions, the controller 100 distinguishes a motion period from a halt period irrespective of the turn-off of a motion key when a user makes a motion with the portable terminal. A description of the typical processing and control operation of the controller 100 will not be provided herein.

The display 102 displays status information (or indicators) generated during the operations of the portable terminal, limited digits and characters, moving pictures, still images, etc. A color LCD (Liquid Crystal Display) can be used as the display 102.

The keypad 104 includes digit keys 0 through 9 and function keys such as a Menu key, a Cancel (Clear) key, an OK key, a Talk key, an End key, an Internet key, and navigation keys (▲/▼/□/□). In addition to its typical functions, the keypad 104 further has a motion key designated to indicate the start and end of a motion of the portable terminal and provides key input data corresponding to a key pressed by a user to the controller 100.

The memory 106 stores programs for controlling the overall operations of the portable terminal, temporarily stores data generated during the operations of the portable terminal, and stores data to be kept (e.g. phone numbers, SMS messages, image data, etc.). According to the present invention, the memory 106 stores a motion database having motion information in relation to motions of the portable terminal.

The motion detector 108 measures the motion status of the portable terminal, and is a type of accelerometer. It measures accelerations along the three X, Y and Z axes and senses the inclination and motion of the portable terminal based on a change in accelerations.

The transmitter/receiver 110 downconverts an RF (Radio Frequency) signal received through the antenna 112 and despreads and channel-decodes the downconverted signal during reception. For transmission, the transmitter/receiver 110 channel-encodes and spread transmission data, upconverts the spread signal to an RF signal, and transmits the RF signal through the antenna 112. It also receives a base station ID (Identifier) on a pilot channel.

The CODEC 114 is connected to the controller 100, and the microphone 116 and the speaker 118 are connected to the CODEC 114 to collectively form a voice input/output block for a voice call. The CODEC 114 converts PCM (Pulse Code Modulation) data received from the controller 100 to an analog voice signal and outputs the voice signal through the speaker 118. It also converts a voice signal received form the microphone 116 to PCM data and provides the PCM data to the controller 100.

In accordance with the present invention, a motion is determined to be completed a predetermined time after a time interval in which no change is observed in each axis acceleration, compared to the conventional technology where the turn-off of the motion key is considered as the indication of motion completion.

In addition, motions can be successively entered. The motions are distinguished from each other by intervening a predetermined halt period between them with the motion key placed in an On state.

This motion entry method will be described below with reference to the flowchart of FIG. 2, which illustrates an improved motion entry operation according to the embodiment of the present invention.

Figure 2:
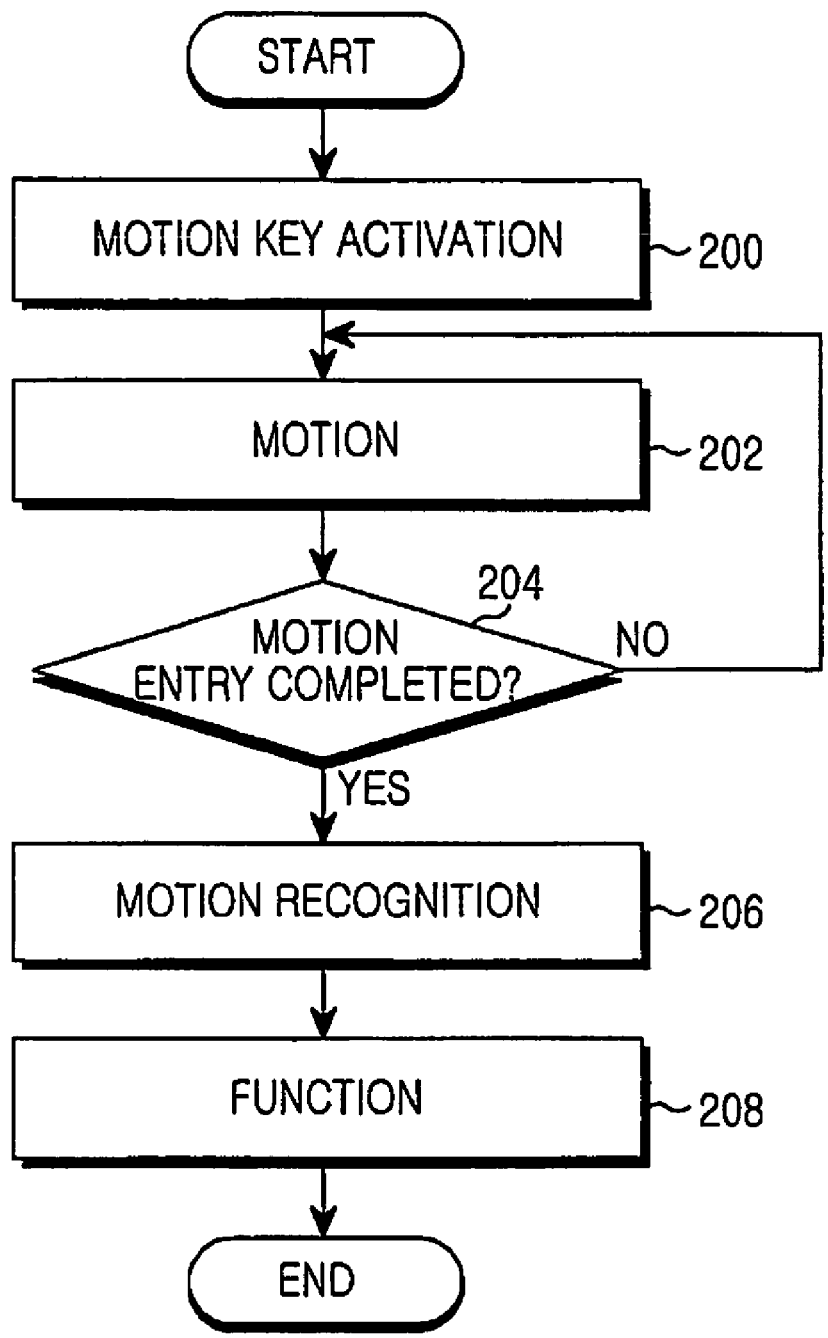
FIG. 2 is a flowchart illustrating an improved motion entry operation according to the embodiment of the present invention.

Referring to FIG. 2, upon turn-on of the motion key to create a motion entry in the portable terminal in step 200, a motion is made in step 202. In step 204, it is determined whether the motion entry is completed. If the motion entry still goes on, the procedure returns to step 202. Upon completion of the motion, the portable terminal recognizes the motion by checking whether the entered motion exists in the motion database in memory 106 in step 206. The portable terminal then invokes a function corresponding to the motion in step 208.

Figure 3:
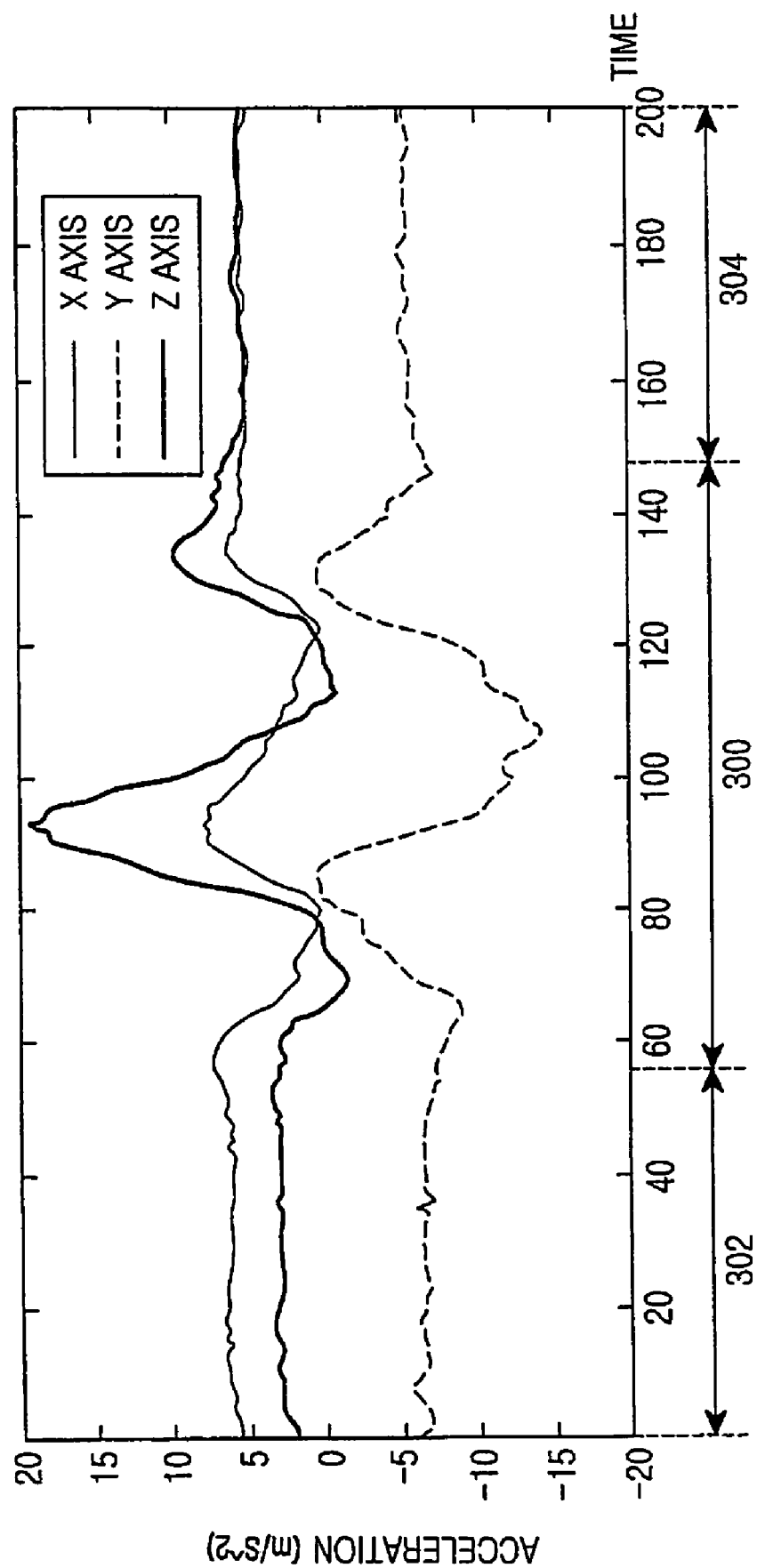
FIG. 3 is a graph illustrating three-axis accelerations over time for the input of a number '0' in the portable terminal having a motion detector according to the embodiment of the present invention.

The motion entry of step 202 will be described in more detail with reference to FIG. 3. FIG. 3 is a graph illustrating three-axis accelerations over time for the input of a number '0' in the portable terminal having a motion detector according to the embodiment of the present invention.

Referring to FIG. 3, reference numeral 300 denotes a motion period in which a motion is actually made with the portable terminal. Reference numerals 302 and 304 denote halt periods in which not much variation is observed in the accelerations of the portable terminal. Specifically, the portable terminal is in a stationary state before a motion is made in the period 302 and after the motion is made in the period 304.

The motion completion determining step 204 of FIG. 2 will be detailed with reference to the flowchart of FIG. 4, which illustrates a motion completion detecting operation according to the embodiment of the present invention.

Figure 4:
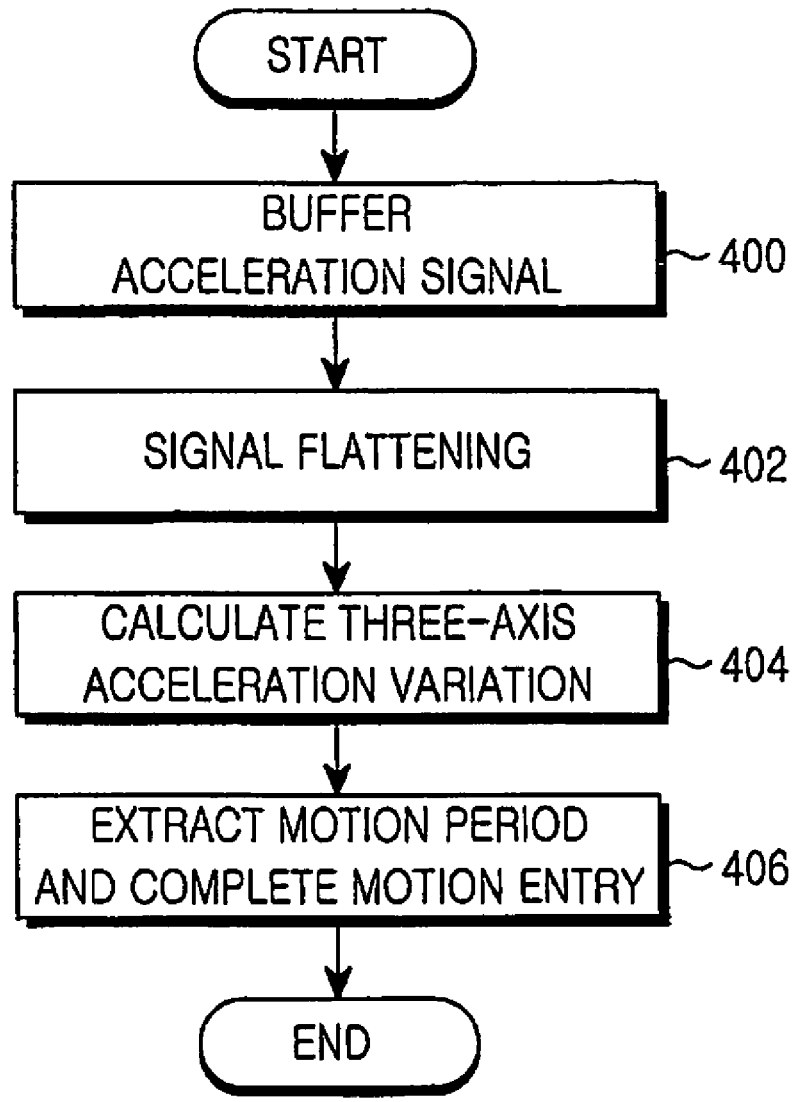
FIG. 4 is a flowchart illustrating a motion completion detecting operation according to the embodiment of the present invention.

Referring to FIG. 4, the portable terminal buffers acceleration signals in order to distinguish a motion period from a halt period on a predetermined time interval basis using each axis-acceleration of a motion in step 400. This step will be described in detail with reference to FIG. 5.

Figure 5:
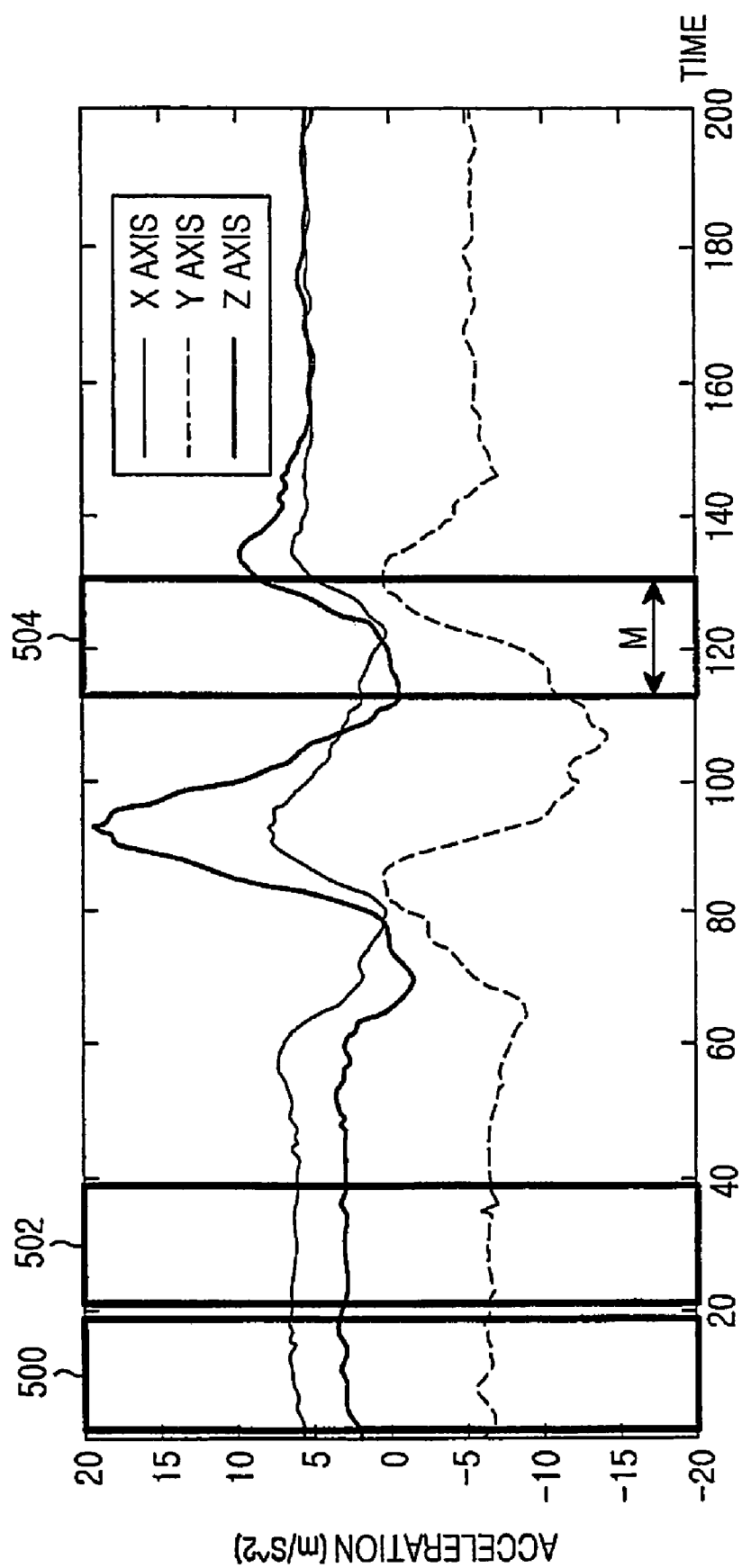
FIG. 5 is a graph illustrating a motion period and a halt period in terms of predetermined time units according to the embodiment of the present invention.

FIG. 5 is a graph illustrating a motion period and a halt period in terms of predetermined time intervals according to the embodiment of the present invention. For the predetermined time interval, M acceleration measurements are carried out with respect to each axis. Reference numerals 500 and 502 refer to halt periods in which no acceleration variation is created, and reference numeral 504 denotes a motion period in which there is an acceleration variation.

Figure 6:
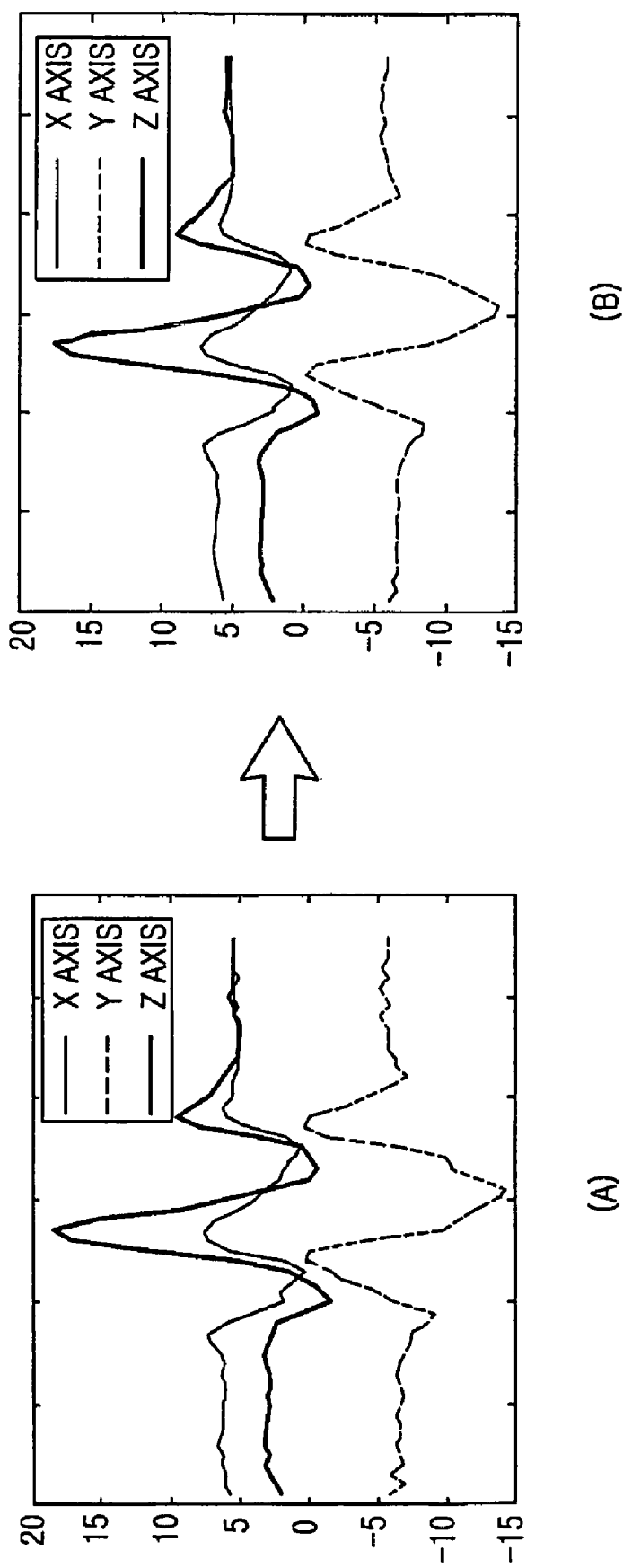
FIG. 6A is a graph illustrating three-axis accelerations over time before signal flattening according to the embodiment of the present invention.
FIG. 6B is a graph illustrating three-axis accelerations over time after signal flattening according to the embodiment of the present invention.

Referring to FIG. 4 again, signal flattening is performed in step 402 using the sum of weighted M accelerations in each time interval by the following Equation (1), as illustrated in FIG. 6B.

$$A'_i(t) = \sum_{j=0}^{M} w_j \cdot A_i(t-j)$$

where $A'_i(t)$ denotes the sum of weighted accelerations, $w_j$ denotes a weight, M denotes a number of measuring an acceleration for the predetermined time interval, i denotes X, Y or Z axis, and $A_i(t)$ denotes an each axis acceleration at time t.

FIGS. 6A and 6B are graphs illustrating three-axis accelerations over time before and after signal flattening, respectively according to the embodiment of the present invention.

Referring to FIG. 4 again, after signal flattening in step 402, the portable terminal calculates a three-axis acceleration variation in each time interval for which M accelerations are measured, by the following Equation (2) in step 404.

$$D_i(t) = \max_{p=t-M}^{t-1} |A_i(t) - A_i(p)|$$
$$D(t) = \sqrt{D_x^2(t) + D_y^2(t) + D_z^2(t)} \quad (2)$$

where D(t) denotes the variation of the acceleration along each axis at time t, i denotes X, Y or Z axis, $A_i(t)$ denotes an each axis acceleration at time t, and M denotes a number of measuring an acceleration for the predetermined time interval.

Figure 7:
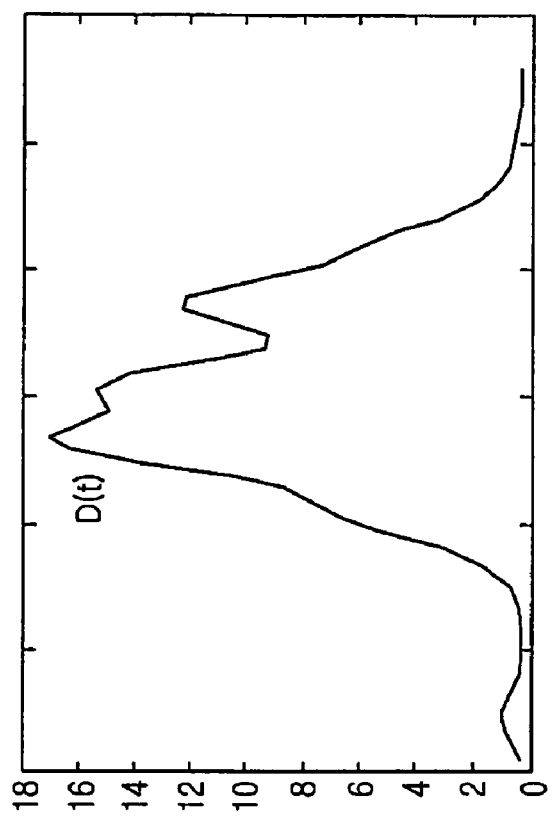
FIGS. 7A and 7B are graphs illustrating three-axis accelerations and their variation over time after signal flattening according to the embodiment of the present invention.
Figure 7:
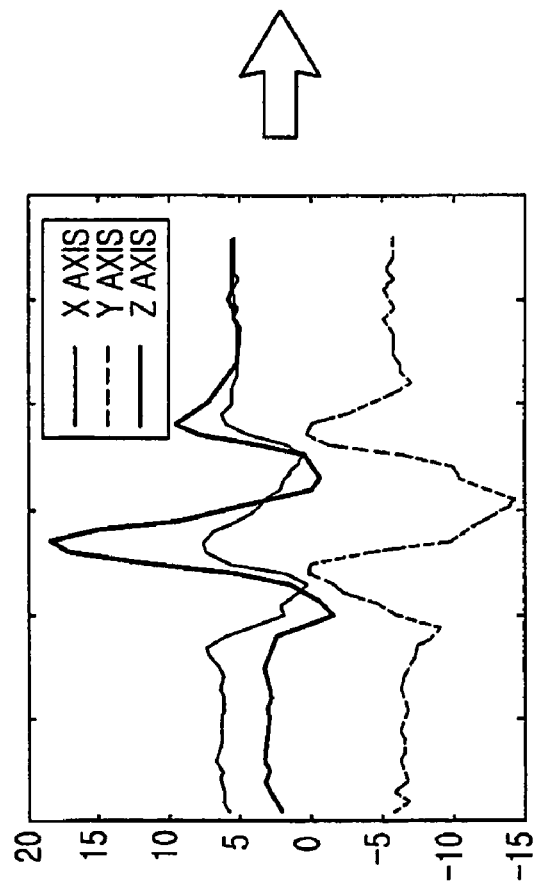

An acceleration variation computed by the above equation is the difference between an acceleration at time t and an acceleration which is the most different from the acceleration at time t, as noted from FIGS. 7A and 7B. FIGS. 7A and 7B are graphs illustrating three-axis accelerations and their variation over time after signal flattening according to the embodiment of the present invention.

Referring to FIG. 4 again, the portable terminal extracts a time period with an acceleration variation exceeding a predetermined threshold θ as a motion period and if a halt period lasts a predetermined number of time intervals after the motion period, the portable terminal considers that the motion is completed in step 406. This step will be described in more detail with reference to FIG. 8.

Figure 8:
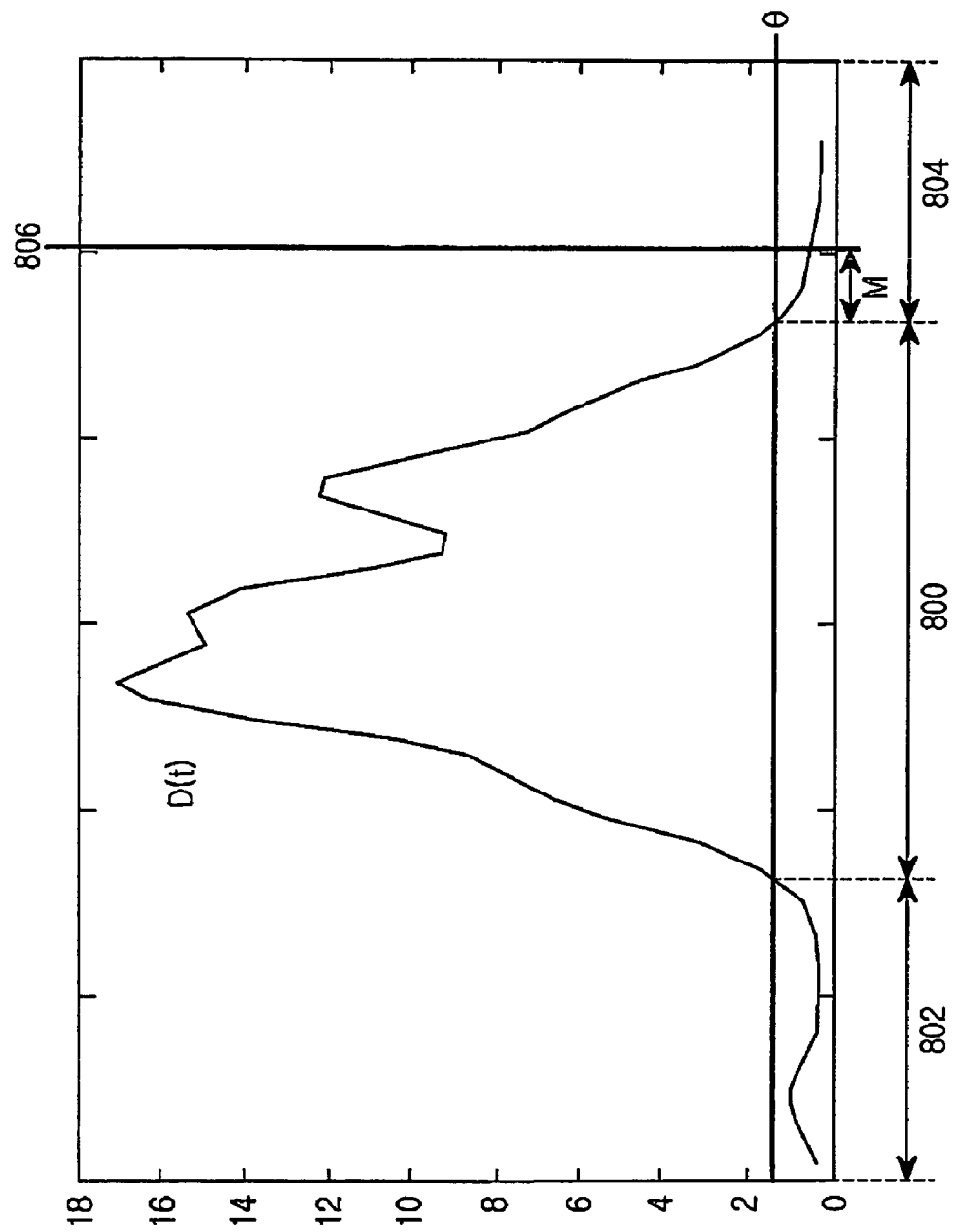
FIG. 8 is a graph illustrating a motion period which is detected by comparing the three-axis acceleration variation with a predetermined threshold according to the embodiment of the present invention.

FIG. 8 is a graph illustrating a motion period which is detected by comparing the three-axis acceleration variation with the predetermined threshold according to the embodiment of the present invention.

Referring to FIG. 8, an acceleration variation is larger than the threshold θ in a motion period 800. The motion period 800 is longer than a predetermined motion recognition time period. In halt periods 802 and 804, the acceleration variation is less than the threshold θ. The halt periods 802 and 804 each are longer than a predetermined hold recognition time period.

If the acceleration variation is maintained less than the threshold for a predetermined time interval after the motion period 800, the portable terminal considers that a motion is completed at a time 806 when the predetermined time interval expires.

Meanwhile, it may occur that the acceleration variation of a particular motion is less than the threshold within the motion period 800. If the acceleration variation is maintained less than the threshold for a time period shorter than the predetermined time interval, the portable terminal considers that this time period falls within the motion period 800.

The threshold θ can be varied depending on situations. For instance, in the case where the user severely shakes his hand or within a vehicle or the subway suffering large vibrations, the shaking or vibrations cause variations in a three-axis acceleration signal without movement of the portable terminal. Thus, the acceleration variation exceeds the threshold and the portable terminal wrongly decides that a halt period is a motion period.

To solve this problem, the threshold is variably set by averaging the variations of initial input accelerations created upon pressing the motion key under the assumption that the user makes no motion for a while after pressing the motion key. Let the average of initial N acceleration variations {D(1), D(2), ..., D(N)} be denoted by D'(N). Then the threshold θ can be set to D'(N). If the maximum value of the acceleration variations is D"(N), the threshold θ can be set to D"(N). Selection of the average or maximum value depends on which one leads to an optimum result. N is the number of samples input for a time period between pressing the motion key and a real motion. The time period can be the time taken until a message indicating a motion entry is available is displayed.

As described above, the present invention provides a motion-recognition method and a portable terminal having a motion key to create a motion entry upon activation, a motion detector for measuring three-axis accelerations for a motion, and a controller for receiving the three-axis accelerations in each predetermined time interval from the motion detector and determining whether the motion entry is completed based on the three-axis accelerations. Thus, a motion recognition rate is increased and the automatic detection of motion completion provides user convenience.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable terminal comprising:
   a motion key for starting to create a motion entry, upon activation;
   a motion detector for measuring an acceleration along each axis of the portable terminal, upon activation of the motion key; and
   a controller for determining whether the motion entry has been completed based on a variation of the acceleration along each axis,
   wherein the controller determines that the motion entry has been completed if a halt period lasts for a predetermined time after a motion period, the halt period being a time period in which the variation of the acceleration along each axis is less than a predetermined threshold, and the motion period being a time period in which the variation of the acceleration along each axis is greater than the threshold, and
   wherein the predetermined threshold is variably set by averaging variations of initial input accelerations created during a pressing the motion key.

2. The portable terminal of claim 1, wherein the threshold is an average of acceleration variations measured for an initial predetermined time period.

3. The portable terminal of claim 1, wherein the threshold is a maximum of the acceleration variations measured for an initial predetermined time period.

4. The portable terminal of claim 1, wherein before the variation of the acceleration along each axis is calculated, signal flattening is performed on the acceleration along each axis by $$A'_i(t) = \sum_{j=0}^{M} w_j \cdot A_i(t-j)$$

where $A'_i(t)$ denotes a sum of weighted accelerations, $w_j$ denotes a weight, M denotes a number of measuring an acceleration for the predetermined time, i denotes X, Y or Z axis, and $A_i(t)$ denotes an each axis acceleration at time t.

5. The portable terminal of claim 1, wherein the variation of the acceleration along each axis is calculated by $$D_i(t) = \max_{p=t-M}^{t-1} |A_i(t) - A_i(p)|$$

$$D(t) = \sqrt{D_x^2(t) + D_y^2(t) + D_z^2(t)}$$

where D(t) denotes the variation of the acceleration along each axis at time t, i denotes X, Y or Z axis, $A_i(t)$ denotes an each-axis acceleration at time t, and M denotes a number of measuring an acceleration for the predetermined time.

6. The portable terminal of claim 1, wherein the motion period is longer than a predetermined motion recognition time period and the halt period is longer than a predetermined halt recognition time period.

7. A method of detecting motion entry completion in a portable terminal, comprising the steps of:
activating a motion key;
creating a motion entry upon activation of the motion key;
measuring an acceleration along each axis of the portable terminal; and
determining whether the motion entry has been completed based on a variation of the acceleration along each axis,
wherein the motion entry is determined to be completed if a halt period lasts for a predetermined time after a motion period, the halt period being a time period in which the variation of the acceleration along each axis is less than a predetermined threshold, and the motion period being a time period in which the variation of the acceleration along each axis is greater than the threshold, and
wherein the predetermined threshold is variably set by averaging variations of initial input accelerations created during a pressing the motion key.

8. The method of claim 7, wherein the threshold is an average of acceleration variations measured for an initial predetermined time period.

9. The method claim 7, wherein the threshold is a maximum of the acceleration variations measured for an initial predetermined time period.

10. The method of claim 7, wherein the determining step comprises, before the variation of the acceleration along each axis is calculated, performing signal flattening on the acceleration along each axis by $$A'_i(t) = \sum_{j=0}^{M} w_j \cdot A_i(t-j)$$

where $A'_i(t)$ denotes a sum of weighted accelerations, $w_j$ denotes a weight, M denotes a number of measuring an acceleration for the predetermined time, i denotes X, Y or Z axis, and $A_i(t)$ denotes an each axis acceleration at time t.

11. The method of claim 7, wherein the determining step comprises calculating the variation of the acceleration along each axis by $$D_i(t) = \max_{p=t-M}^{t-1} |A_i(t) - A_i(p)|$$

$$D(t) = \sqrt{D_x^2(t) + D_y^2(t) + D_z^2(t)}$$

where D(t) denotes the variation of the acceleration along each axis at time t, denotes X, Y or Z axis, $A_i(t)$ denotes an each axis acceleration at time t, and M denotes a number of measuring an acceleration for the predetermined time.

12. The method of claim 7, wherein the motion period is longer than a predetermined motion recognition time period and the halt period is longer than a predetermined halt recognition time period.

\* \* \* \* \*